July 4, 1967
G. L. HILLMAN
3,329,108
PORTABLE LEAF BURNING APPARATUS
Filed July 12, 1965
3 Sheets-Sheet 1
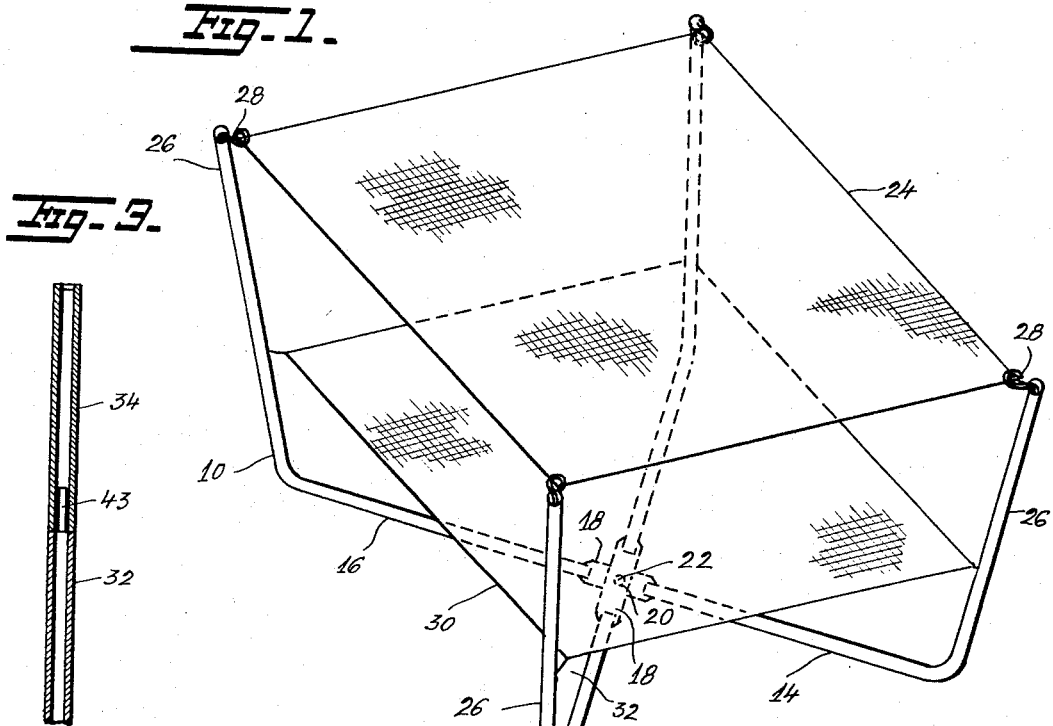
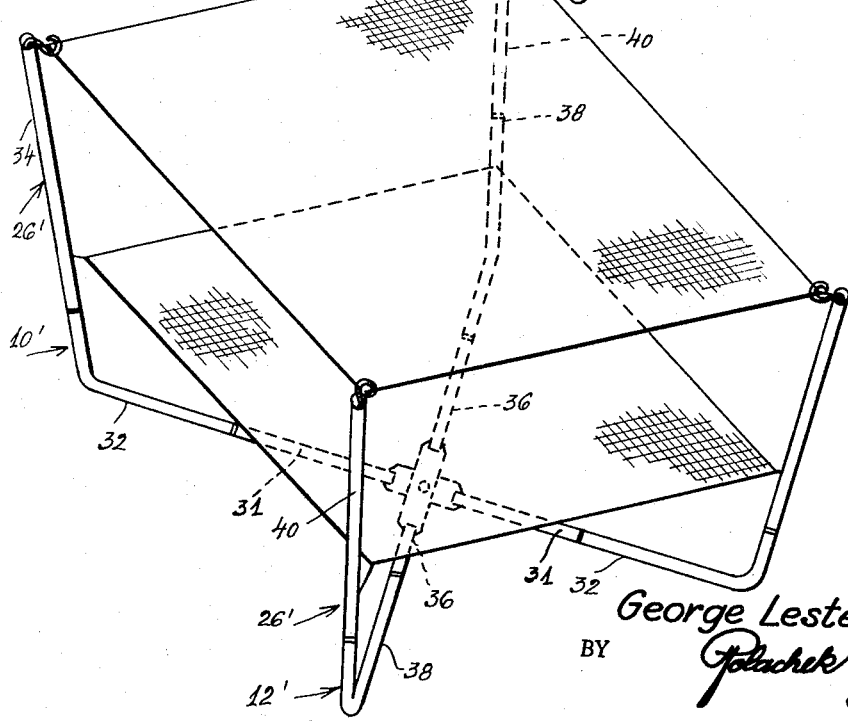
INVENTOR
George Lester Hillman
BY Polachek & Saulsbury
ATTORNEYS.

July 4, 1967
G. L. HILLMAN
3,329,108
PORTABLE LEAF BURNING APPARATUS
Filed July 12, 1965
3 Sheets-Sheet 2
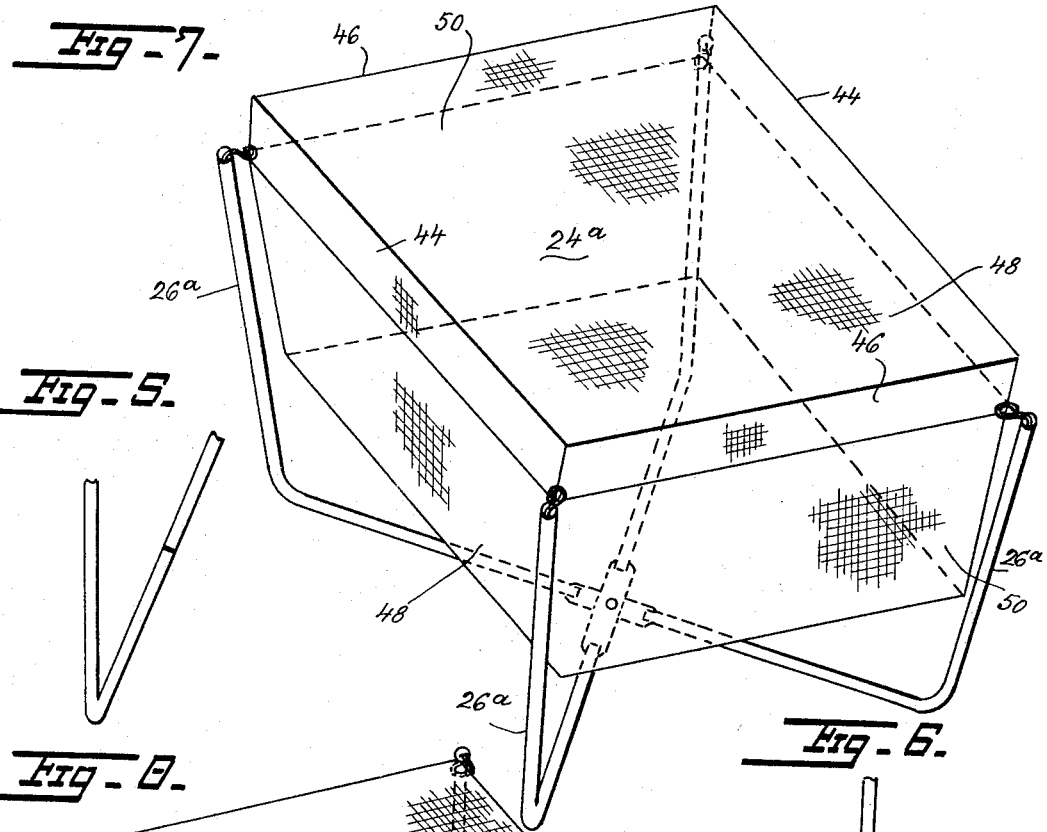
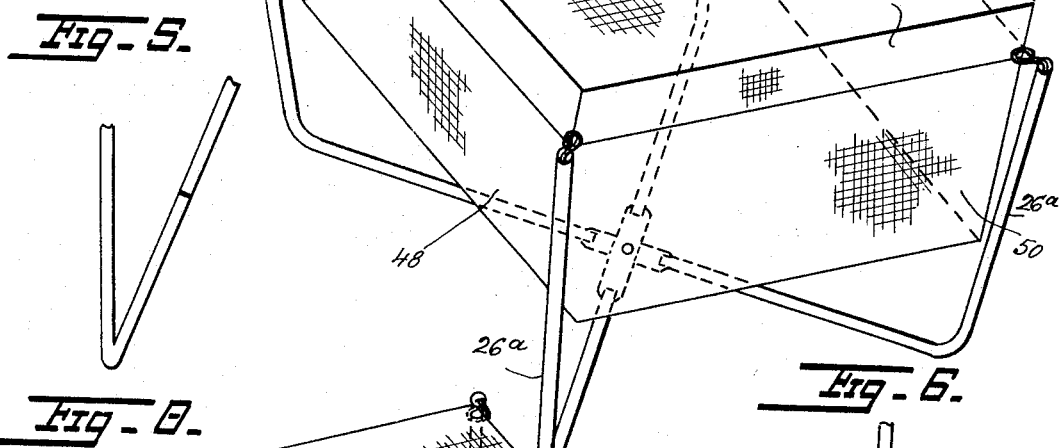
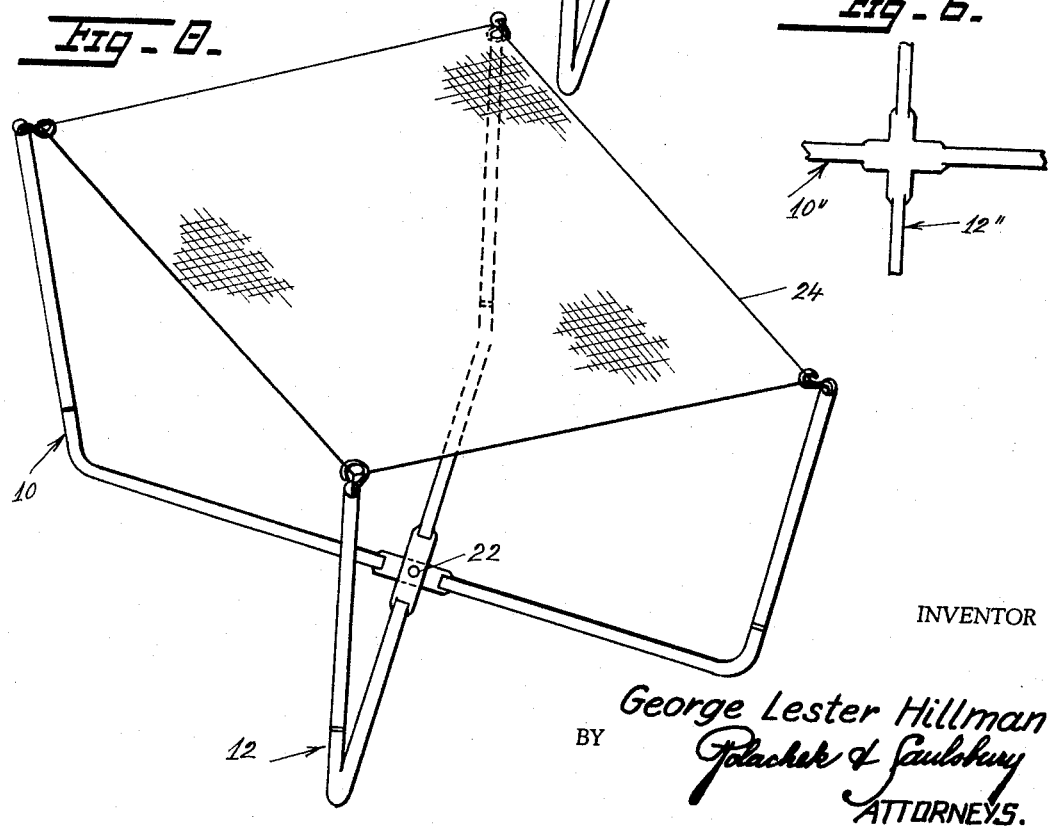
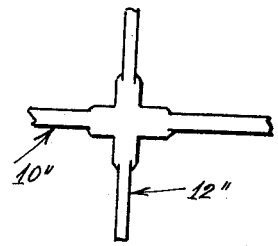
INVENTOR
George Lester Hillman
BY Polachek & Saulsbury
ATTORNEYS.

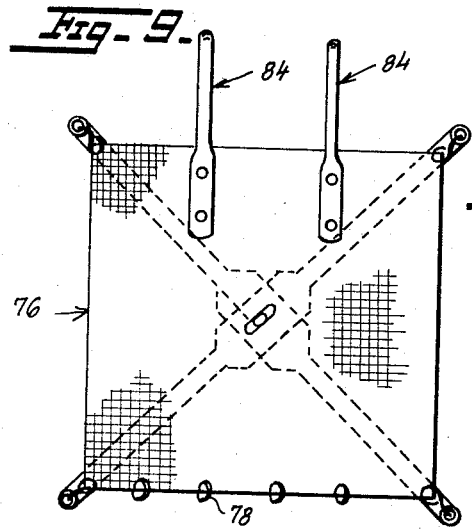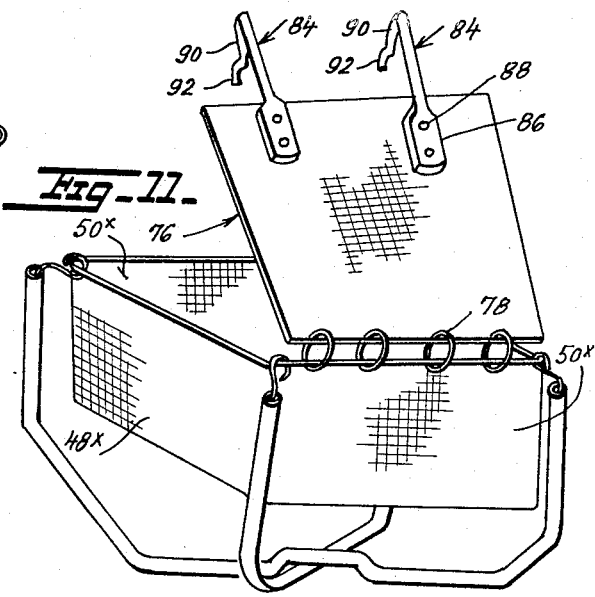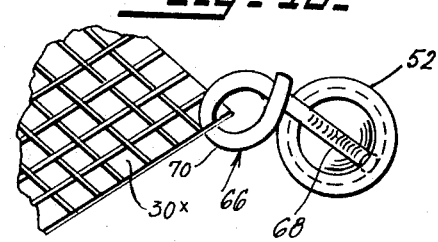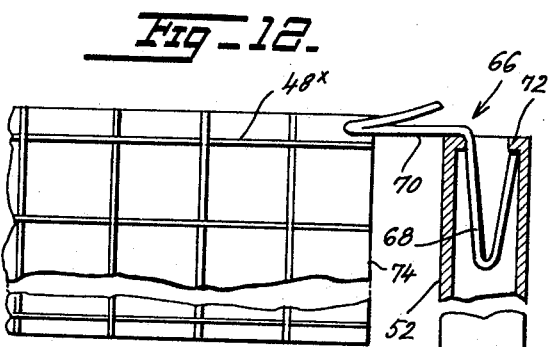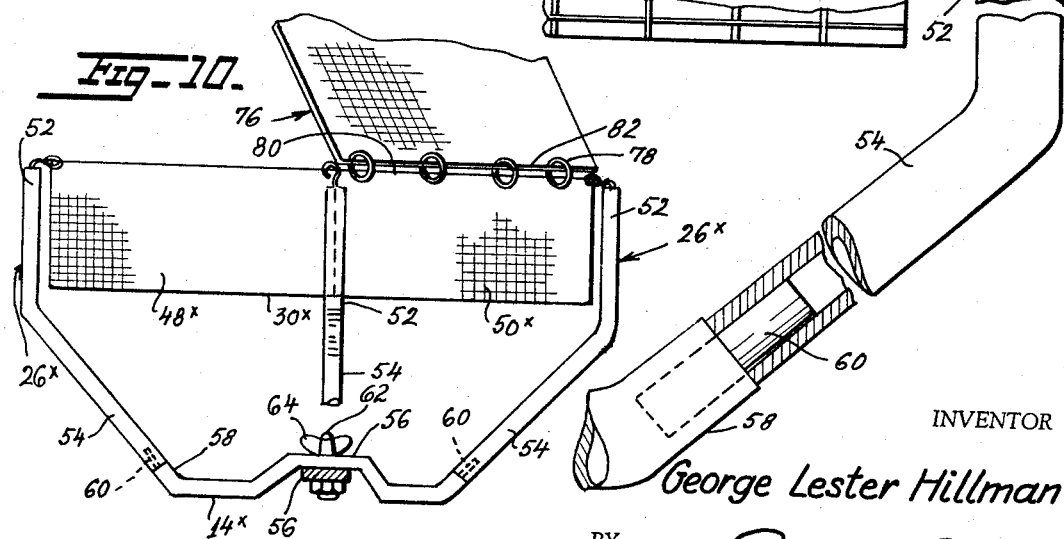

United States Patent Office 3,329,108
Patented July 4, 1967

3,329,108
PORTABLE LEAF BURNING APPARATUS
George Lester Hillman, Yonkers, N.Y.
(16 Sunset Road, Rhinebeck, N.Y. 12572)
Filed July 12, 1965, Ser. No. 471,342
2 Claims. (Cl. 110—18)

ABSTRACT OF THE DISCLOSURE

Portable leaf burning apparatus having a frame composed of a pair of crossed substantially U-shaped frame members, the bight portions thereof being offset and joined, the remainder of the members being slanted and upright. The upright portions support a grid with upward side and end wire mesh extensions. A wire mesh lid is hinged to top edge of one of the end extensions with latching means to hold the lid closed

---

This invention relates generally to burning apparatus and more particularly to portable, readily steerable, equipment which can be employed around the home for disposing of combustible materials by burning. This application is a continuation-in-part of my copending application Ser. No. 236,968, filed Nov. 13, 1962, now Patent No. 3,207,103.

Organic material such as leaves, cut grass and flower stalks accumulate in quantities as a result of gardening activities, and disposal of this material becomes a problem. Burning of the material is a method commonly employed for elimination of such gardening refuse. Burning means employed for such purposes take the form of circular containers made of wire mesh or just as commonly, the organic refuse is allowed to accumulate in a pile on the ground and when thoroughly dry is ignited. The latter method results in an unsightly accumulation of charred refuse which remains from the incomplete burning which is the product of an inadequate supply of air. The circular containers first mentioned, though possessing better burning ability, lack a sufficient exposure area to the air needed for combustion and therefore leaves an unburned residue of relatively large volume. Although apparatus of this nature could be adapted to provide a greater area for burning, a fundamental disadvantage would result in that the apparatus would become difficult to store.

Accordingly, a principal object of the present invention is to provide burning equipment that provides an extended burning area while at the same time is easily transported and stored.

Another object of the invention is to provide burning equipment of this kind that provides adequate combustion of organic material so that a minimum residual ash results, which is retained in easily transportable and disposable form.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top perspective view of portable burning apparatus embodying one form of my invention, FIG. 2 is a similar view of portable burning apparatus embodying a modified form of the invention, FIG. 3 is a vertical sectional view through one of the arms of the frame, FIG. 4 is a similar view through one base portion of the U-frame, FIG. 5 is a front elevational view of a fragment of a U-shaped frame, FIG. 6 is a top plan view of a modified form of joint for the frame, FIG. 7 is a view similar to FIG. 1 of burning apparatus embodying yet another modified form of the invention, FIG. 8 is a similar view of burning apparatus embodying a still further modified form of the invention, FIG. 9 is a top plan view of a portable refuse burnable apparatus embodying still another modified form of the invention, FIG. 10 is a side elevational view thereof, parts being shown broken away, FIG. 11 is a top perspective view thereof showing the lid in partly open position, FIG. 12 is a fragmentary side elevational view of one corner of the apparatus, on an enlarged scale, parts being shown broken away, and FIG. 13 is a top plan view of a corner of the apparatus.

Referring now in detail to the various views of the drawings, the burning apparatus shown in FIG. 1 comprises a frame consisting of two U-shaped members indicated generally at 10 and 12. The U-shaped tubular members are arranged so that the bight portions or base portions 14 and 16, respectively, thereof cross each other midway the ends of the bight portions. At the point of crossing, the bight portions are flattened as indicated at 18, 18 and formed with aligned holes 20 to receive a loosely double-headed pivot pin 22. The U-shaped frames are adapted to rotate on the pin 22 to collapsed form when they are substantially in alignment with each other.

A grid 24 is fastened to the ends of the arms 26, 26 of the frame by means of wires or cord 28. The grid is in the form of a wire screen of small mesh such as commonly known in the trade as chicken wire. The only prerequisite is that the holes between the wire be large relative to the diameter of the wires, and that the greatest possible unobstructed area is left available for the free flow of air to the material burning on the grid. Another prerequisite is to allow a large mesh opening between the wires in order that burned material may readily fall through the openings.

Another grid 30 is positioned under and spaced from the grid 24 and is fastened and supported by the arms 26 by means of wires 32. Grid 30 is similarly constructed of the same material as grid 24. The primary function of the grid 30 is to serve to receive the burnt material from grid 24 through the openings in the grid 24. For this purpose, the wires of grid 30 are consequently closely spaced and small openings of the order of a sixteenth of an inch are preferred. Screening such as commonly used in making window screens for preventing the entry of insects into the house is an example of material that can be employed for grid 30. An impervious material such as thin sheet metal could also be used, but the fine mesh screen in preferred because of its flexibility and consequent ease of storing this material.

In operation, assuming the burning apparatus is in the storage or collapsed position, the U-shaped frames 10 and 12 are opened by rotating these frames around pin 22 until the bight portions or base portions 14 and 16 are roughly at right angles to each other. The grid 24 is then tied to the upright arms 26 and the grid 30 is next similarly tied to the arms 26. The grids prevent the U-shaped frames from accidentally turning.

The material to be burnt is placed on the grid 24 and due to the large burning area provided and the unobstructed flow of air provided, the material burns to a fine ash which drops onto the grid 30 and is retained thereon.

The burning apparatus is readily collapsed to fit into a small area after the burning operation is completed.

In FIGS. 2 to 5, inclusive, a burning apparatus embodying a modified form of the invention is shown. This form differs from the apparatus shown in FIG. 1 in that the U-shaped frames 10' and 12' are sectional and may be adjusted endwise and upwardly. The frame 10' is composed of tubular sections 31, 32 and 34. The sections 31 form part of the bight or base portion of the U-frame 10, the sections 32 are angular forming parts of the bight or base portion and of the upright arms, and the sections 34 form the tops of the arms 26'. The sections 36, 38 and 40 of U-shaped frame 12 are similarly constructed, the sections 36 forming part of the bight or base portion of the U-frame 12, the sections 38 being angular forming parts of the bight or base portion and of the upright arms, and the sections 40 forming the tops of the arms 26'. The sections 31 and 32 are formed at one end with extensions 41 and 43, respectively which are smaller in diameter than the diameter of the tubular members whereby said extensions serve as plugs for slidable connection with the tubular members, in order to adjust the length of the tubular members.

In FIG. 6, there is shown a modified U-frame structure wherein the U-frames 10" and 12" are formed integrally with each other and cannot rotate relative to each other in order to collapse.

FIG. 7 shows another modified form of burning apparatus which differs from the burning apparatus of FIG. 1 merely in that a strip of wire mesh forms an upright extension 44 on the sides of the upper grid 24a and similar extensions 46 on the ends thereof. This prevents the ash and refuse from being blown off of the grid 24. Side walls 48 and end walls 50 may also be supported by the arms 26a.

In FIG. 8 yet another modified form of burning apparatus is shown which differs from the burning apparatus of FIG. 1 only in that there is no bottom grid such as grid 28 of FIG. 1.

Referring now to the embodiment of the invention shown in FIGS. 9 to 13, inclusive, this form differs from the form shown in FIG. 7 in that the upright arm sections 26x of the frame are each formed with a vertical portion 52 and a downwardly and inwardly slanting portion 54. The bight or base sections 14x of the frame have offset flattened portions 56 midway the ends thereof and have upwardly bent ends 58 which are connected to the inwardly slanting portions 54 of the arms 26x by means of elongated round pins 60 inserted into the abutting ends. The flattened portions 56 of the bight sections are arranged in crossed overlapping relation and are formed with aligned holes to receive a headed bolt 62 which is held in position by a wing nut 64.

A principal feature of this form of the invention is the novel means for connecting the side and end walls 48x and 50x, respectively, to the upright portions 52 of the arms 26x of the frame. For this purpose as best seen in FIGS. 12 and 13, an elongated spring wire connector 66 is provided. The connector has a V-shaped body 68 with a radial and lateral extension in the form of an open pigtail coil 70. The V-shaped body 60 is inserted through the open end of the vertical portion 52 at the top thereof over an inwardly extending annular flange 72, with a snap action, the free end of the V-shaped body interlocking with the annular flange 72 to hold the body in position as seen in FIG. 12. The pigtail coil 70 is looped around the adjacent end vertical wire 74 of the wire mesh side wall 48x as best seen in FIGS. 12 and 13.

Instead of wire mesh extensions 44 and 46 on the side and end walls 48x and 50x, respectively as in FIG. 7, the top grid 24a of FIG. 7 is omitted and instead a wire mesh lid or cover 76 is hingedly mounted at one end on the top edge of one of the end walls 50x by means of spaced rings 78 loosely encircling the top cross wire 80 of said one end wall 50x and the adjacent end cross wire 82 of the lid or cover. The lid or cover 76 encloses the open top of the enclosure defined by the side and end walls 48x and 50x, respectively, and grid 30x, and is adapted to be held in closed position by means of elongated latching devices 84, each device consisting of a round wire body flattened at one end 86 and anchored to the top surface of the wire mesh lid or cover 76 by spot welds 88. The round wire body is bent downwardly midway its ends and the free bent end portions 90 are slanted inwardly and provided with hooks 92 at the extreme ends adapted to snap over the cross wires of the end wall 50x to releasably hold the lid or cover closed.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. Burning apparatus comprising two tubular members, each having a substantially U-shaped body wherein the base of said U-shaped body is essentially straight with an offset flattened portion being in crossed overlapping relation, the ends of said base being bent upwardly, means for releasably securing the flattened portions to each other, the arms of said U-shaped body slanting upwardly from the bent ends of the base and then extending vertically, a grid of wire members extending horizontally between the vertically extending portion of the arms, side walls of mesh members extending across the space between said vertically extending portions of the arms, end walls of mesh members extending between said vertically extending portions, means for releasably securing the top of the side and end walls to the tops of the vertically extending portions of the arms, and a lid of wire mesh hingedly connected to the top edge of one of the end walls, said means for releasably securing the tops of the side and end walls to the tops of the vertically extending portions of the arms including elongated wire connectors each having a V-shaped end mounted in the top of the adjacent tubular vertically extending portions and having a pigtail coil on the other end thereof hooked around the adjacent wire mesh of the side and end walls.

2. Burning apparatus comprising two tubular members, each having a substantially U-shaped body wherein the base of said U-shaped body is essentially straight with an offset flattened portion midway the ends thereof, the flattened portions being flattened in crossed overlapping relation, the ends of said base being bent upwardly, means for releasably securing the flattened portions to each other, the arms of said U-shaped body slanting upwardly from the bent ends of the base and then extending vertically, a grid of wire members extending horizontally between the vertically extending portions of the arms, side walls of mesh members extending across the space between said vertically extending portions of the arms, end walls of mesh members extending between said vertically extending portions, means for releasably securing the top of the side and end walls to the tops of the vertically extending portions of the arms, and a lid of wire mesh hingedly connected to the top edge of one of the end walls, said hinge connection including a series of spaced rings loosely looped around the end cross wire at one end of the lid and around the top cross wire of the adjacent end wall, said means for releasably securing the tops of the side and end walls to the tops of the vertically extending portions of the arms including elongated wire connectors, each having a V-shaped end removably mounted in the top of the adjacent tubular vertically extending portions and having a pigtail coil on the other end thereof hooked around the adjacent wire mesh of the side and end walls.

References Cited

UNITED STATES PATENTS

| | | | |
|---|---|---|---|
| 641,245 | 1/1900 | Sugg | 150—49 |
| 876,180 | 1/1908 | Hemenway et al. | |
| 1,499,665 | 7/1924 | Kaufman | 110—18 |
| 1,601,657 | 9/1926 | Thompson | 110—18 |
| 2,502,781 | 4/1950 | Erickson | 220—19 |
| 3,207,103 | 9/1965 | Hillman | 110—18 |

JAMES W. WESTHAVER, *Primary Examiner.*